United States Patent
Stoffel et al.

(10) Patent No.: US 7,591,889 B2
(45) Date of Patent: Sep. 22, 2009

(54) DISSIMILAR PIGMENTS FOR USE IN DARK AND LIGHT INKJET INKS

(75) Inventors: John L. Stoffel, San Diego, CA (US); David Tyvoll, La Jolla, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 604 days.

(21) Appl. No.: 11/071,354

(22) Filed: Mar. 3, 2005

(65) Prior Publication Data
US 2006/0075925 A1   Apr. 13, 2006

Related U.S. Application Data

(60) Provisional application No. 60/617,397, filed on Oct. 8, 2004.

(51) Int. Cl.
*C09D 11/02* (2006.01)
(52) U.S. Cl. .................................. 106/31.6; 106/31.65
(58) Field of Classification Search ............... 106/31.6, 106/31.65
See application file for complete search history.

(56) References Cited

U.S. PATENT DOCUMENTS

| 5,795,082 | A | 8/1998 | Shimada et al. | |
|---|---|---|---|---|
| 6,399,674 | B1 * | 6/2002 | Kashiwazaki et al. | 523/161 |
| 6,478,862 | B1 * | 11/2002 | Elwakil | 106/31.6 |
| 6,521,030 | B1 | 2/2003 | Stoffel | |
| 6,655,784 | B2 | 12/2003 | Kakutani | |
| 6,670,409 | B2 * | 12/2003 | Yatake | 523/160 |
| 7,188,943 | B2 * | 3/2007 | Gondek et al. | 347/100 |
| 2001/0035110 | A1 * | 11/2001 | Kato | 106/31.6 |
| 2002/0038613 | A1 * | 4/2002 | Yatake | 106/31.6 |
| 2003/0035034 | A1 | 2/2003 | Fukumoto et al. | |
| 2003/0056687 | A1 * | 3/2003 | Sano | 106/31.6 |
| 2003/0210310 | A1 * | 11/2003 | Wachi | 347/100 |
| 2004/0017450 | A1 | 1/2004 | Kawamura | |
| 2004/0035320 | A1 | 2/2004 | Sano | |
| 2004/0074018 | A1 | 4/2004 | Wuzik et al. | |
| 2004/0187732 | A1 | 9/2004 | Roman et al. | |
| 2004/0239738 | A1 * | 12/2004 | Watanabe | 347/100 |
| 2005/0284329 | A1 * | 12/2005 | Jackson et al. | 106/31.6 |
| 2006/0268084 | A1 * | 11/2006 | Nishizaki et al. | 347/100 |

FOREIGN PATENT DOCUMENTS

| EP | 1 172 422 A | 1/2002 |
|---|---|---|
| JP | 2003-213181 | 7/2003 |
| JP | 2004-107427 | 4/2004 |

* cited by examiner

*Primary Examiner*—Jerry Lorengo
*Assistant Examiner*—Veronica Faison Gee

(57) ABSTRACT

An ink set providing reduced differential lightfade and graininess. The ink set comprises at least one dark inkjet ink and at least one light inkjet ink. The dark inkjet ink comprises at least one pigment having a high chromaticity and a low lightfastness and the light inkjet ink comprises at least one less chromatic pigment having a high lightfastness. The pigment in the dark inkjet ink is dissimilar from the pigment in the light inkjet ink in at least one of a crystal form, particle size, chromophore, and chemical dispersant. A method of reducing differential lightfade and graininess in a printed image is also disclosed.

65 Claims, No Drawings

DISSIMILAR PIGMENTS FOR USE IN DARK AND LIGHT INKJET INKS

CROSS REFERENCE TO RELATED APPLICATION

This application claims the benefit of U.S. provisional patent application Ser. No. 60/617,397, filed Oct. 8, 2004.

FIELD OF THE INVENTION

The present invention relates to inkjet printing and, in particular, to a pigment-based ink set for improving print quality of a printed image.

BACKGROUND OF THE INVENTION

The use of inkjet printing systems has grown dramatically in recent years, which may be attributed to substantial improvements in print resolution and overall print quality coupled with appreciable reduction in cost. Notwithstanding their recent success, intensive research and development efforts continue toward improving inkjet print quality. In general, inkjet print quality still falls short of that produced by more expensive technologies, such as photography and offset or gravure printing. A surge in interest in inkjet imaging (e.g., the rendition of pictures) has resulted in the need to produce near photographic quality printed images at a reasonable cost. The challenge remains to further improve the image quality and lightfastness of inkjet printed images, especially images containing skin tones, without increasing their cost.

Color inkjet printers typically use four inkjet inks: cyan, yellow, magenta, and black. To provide a desired color or hue, each of the inkjet inks includes a colorant, such as a pigment and/or dye, dispersed or dissolved in an ink vehicle. A perceived color is typically described using a color space, such as Commission Internationale de l'Eclairage ("CIELAB") or Munsell, which are well known in the art. For example, in the Munsell color space, a particular color is defined using three terms: hue, value, and chroma. In the CIELAB color space, a particular color is defined by three terms: $L^*$, $a^*$, and $b^*$. $L^*$ defines the lightness of a particular color and typical $L^*$ values range from zero (black) to 100 (white). The terms $a^*$ and $b^*$, together, define the hue and chroma of a particular color. Chroma, $C^*$, is defined according to the equation $C^*=[(a^*)^2+(b^*)^2)]^{1/2}$. The term $a^*$ ranges from a negative number (green) to a positive number (red). The term $b^*$ ranges from a negative number (blue) to a positive number (yellow).

As used herein, the term "lightfastness" refers to the ability of the inkjet ink to retain its chromaticity and/or optical density after exposure to light. Lightfastness is typically measured by an amount of time to failure, such as years to failure. The failure occurs after a specific percentage of loss in optical density. Typically, highly chromatic pigments exhibit poor lightfastness. In other words, there is generally a tradeoff between the chroma of the pigment and its lightfastness.

Another attribute that is important in producing photographic quality printed images is grain. As used herein, the term "grain" refers to how visible the dots of the inkjet ink are to a viewer. If large, dark drops of the inkjet ink are used, the dots are very visible and image quality is degraded. One solution for reducing grain is to apply smaller drop weights to produce nearly invisible drops. However, this technique results in a more difficult and more costly manufacturing process because smaller orifice holes and resistors are utilized. In addition, reliability is decreased due to the smaller holes.

Another solution to reduce grain is to apply a "light" inkjet ink, such as a light magenta or light cyan, in combination with the normal, or dark, inkjet inks. The light inkjet ink typically has a colorant loading that ranges from 5% to 50% of the colorant loading of the dark inkjet ink. This technique allows larger, low colorant load drops of the inkjet ink to be used. The drops of the light inkjet ink are less visible to the viewer due to the presence of less colorant. However, one disadvantage of this solution is that the light inkjet ink fades much faster on the print medium than the dark inkjet ink. This fade often occurs in critical areas, such as in the skin tone of a human being. To overcome the fading problem, a protective overlaminate is applied to the printed image. However, applying an overlaminate is not an economically feasible option with low cost printers and, therefore, the performance of the output of these printers is limited by graininess, differential lightfade, or a combination thereof. Alternatively, to reduce the lightfade, the graininess or pixilation of the printed image is increased.

As the demand for photographic quality images continues to increase, there is a need for developing inkjet inks that provide printed images that have high chromaticity and high lightfastness with reduced graininess.

BRIEF SUMMARY OF THE INVENTION

The present invention relates to an ink set providing reduced differential lightfade and graininess. The ink set includes at least one dark inkjet ink and at least one light inkjet ink. The dark inkjet ink has at least one pigment having a high chromaticity and a low lightfastness and the light inkjet ink has at least one pigment having a high lightfastness and a low chromaticity. The pigment used in the dark inkjet ink is dissimilar from the pigment in the light inkjet ink in at least one of a crystal form, particle size, chromophore, and chemical dispersant.

The present invention also relates to a method of reducing differential lightfade and graininess in a printed image. The method includes applying at least one dark inkjet ink to a print medium and applying at least one light inkjet ink to the print medium. The dark inkjet ink has at least one pigment having a high chromaticity and a low lightfastness and the light inkjet ink has at least one pigment having a high lightfastness and a low chromaticity. The pigment in the dark inkjet ink is dissimilar from the pigment in the light inkjet ink in at least one of a crystal form, particle size, chromophore, and chemical dispersant.

DETAILED DESCRIPTION OF THE INVENTION

An ink set having a dark inkjet ink and a light inkjet ink is disclosed. As used herein, the phrase "dark inkjet ink" refers to an inkjet ink having a high colorant loading and the phrase "light inkjet ink" refers to an inkjet ink having a low colorant loading. The dark inkjet ink has a colorant loading ranging from approximately 1% to approximately 10% by weight of a total weight of the dark inkjet ink. The light inkjet ink has a colorant loading that ranges from approximately 5% to approximately 50% of the colorant loading of the dark inkjet ink. However, if more than two inkjet inks of the same color are used (such as a monochrome 4-ink black set), the colorant loading of the light inkjet ink may be even greater. For example, the colorant loading in the dark inkjet ink may be approximately 4% and approximately 2.5%, 1.0%, and 0.3% in the light inkjet inks. The ink set provides reduced differential lightfade and graininess.

The dark inkjet ink may include at least one pigment that is more chromatic relative to the pigment in the light inkjet ink.

The pigment in the dark inkjet ink may also have a reduced lightfastness relative to the pigment in the light inkjet ink. As such, the pigment may provide high chromaticity and reduced lightfastness to the dark inkjet ink. Conversely, the light inkjet ink may include at least one pigment having reduced chroma relative to the chroma of the pigment in the dark inkjet ink. The pigment in the light inkjet ink may also have a higher lightfastness than the lightfastness of the pigment in the dark inkjet ink. As such, the pigment may provide high lightfastness and reduced chromaticity to the light inkjet ink. The pigments in the dark and light inkjet inks of a similar color may have a measured chromatic difference (C*) of greater than approximately 5 units. The pigments in the dark and light inkjet inks also have different lightfastness values as measured on a blue wool scale, which is described in detail below.

The ink set may include at least one of a cyan (C), yellow (Y), or magenta (M) dark inkjet ink and at least one of a cyan (c), yellow (y), or magenta (m) light inkjet ink. As used herein, capital letters refer to the dark inkjet inks and lowercase letters refer to the light inkjet inks. A dark black (K) or a light black (grey) (k) inkjet ink may optionally be present in the ink set. The ink set may be used in a conventional six-color printer, such as an HP DeskJet® printer, manufactured by Hewlett-Packard Co. (Palo Alto, Calif.). The six-color printer may include black (K), cyan (C), magenta (M), yellow (Y), light cyan (c), and light magenta (m) inkjet inks. Light black (grey) (k) and light yellow (y) inkjet inks may also be used, such as in an eight-color printer. An ink cartridge having separate ink reservoirs for each of the dark and light inkjet inks may be used to store the dark and light inkjet inks. Alternatively, separate ink cartridges may be used to store the dark and light inkjet inks.

The dark inkjet ink and the light inkjet ink may be applied to a print medium to produce the printed image having near photographic quality. By utilizing dissimilar pigments, the dark inkjet ink may provide a bright or vivid color to the printed image while the light inkjet ink of the ink set may provide improved lightfastness. Therefore, even if a highly chromatic pigment having mediocre or poor lightfastness is used in the dark inkjet ink, a dissimilar pigment, having more robustness in terms of lightfastness, may be used in the light inkjet ink. Generally, the pigment used in the light inkjet ink may provide sufficient chroma in the light or high L* areas, which resolves the differential fade problem that occurs, for example, in skin tones in inkjet color printing.

To achieve the desired chromatic and lightfastness properties, the dark inkjet ink and the light inkjet ink may include dissimilar or different pigments. By utilizing dissimilar pigments, differential lightfade that is typically observed across low and high color density areas of a printed image may be reduced. The printed image may also have a low graininess. Chromatic and lightfastness properties of pigments are known to vary depending on the crystal form, particle size, or chromophore of the pigment. In addition, a manner of dispersing the pigment in the inkjet ink, which is referred to herein as a chemical dispersant, may affect the chromatic and lightfastness properties. Therefore, to provide the desired chromatic and lightfastness properties to the dark and light inkjet inks, at least one of the crystal form, particle size, chromophore, and chemical dispersant of the pigment may be dissimilar between the pigments used in the dark inkjet ink and in the light inkjet ink.

For instance, the pigments used in each of the dark and light inkjet inks may have different chromophores. In this situation, the crystal form, particle size, or chemical dispersant of each of the pigments may be the same or different. Alternatively, the pigments in each of the dark and light inkjet inks may have different particle sizes. In this situation, the crystal form, chromophore, or chemical dispersant of each of the pigments may be the same or different. The pigments in each of the dark and light inkjet inks may also have different crystal forms. In this situation, the particle size, chromophore, or chemical dispersant of each of the pigments may be the same or different. As such, it is contemplated that numerous combinations of pigments may be used in the dark and light inkjet inks as long as at least one of the chromophore, crystal form, particle size, and chemical dispersant is different between the pigment used in the dark inkjet ink and the pigment used in the light inkjet ink.

However, other factors besides the chromophore, particle size, and crystal form may influence the actual lightfastness of a pigment. These other factors include the print medium on which the inkjet ink is deposited, the conditions under which the printed image is stored, and the type of glass used to mount the printed image. Therefore, the blue wool scale values of pigments may deviate from published values, which are obtained for a particular pigment application under particular testing conditions. For instance, reducing the particle size of the pigment generally reduces its lightfastness, which would correspond to a lower value on the blue wool scale. However, the extent of the reduction in lightfastness as a function of particle size depends on the chromophore, and hence is color- and pigment-specific. The lightfastness of some pigments decreases in a linear fashion as the particle size is reduced, whereas the lightfastness of other pigments decreases rapidly below a certain critical particle size.

The pigment used in the light inkjet ink may be an organic pigment, a white inorganic pigment, a colored inorganic pigment, carbon black, or mixtures thereof. The pigment used in the dark inkjet ink may be an organic pigment, carbon black, or mixtures thereof. The pigment in the dark or light inkjet ink may be a black pigment or a colored pigment, such as a blue, black, brown, cyan, green, white, violet, orange, magenta, red, or yellow pigment. In addition, mixtures of colored pigments or mixtures of black and colored pigments may be used. Since the lightfastness and chromatic properties are a function of the relative proportions or ratios of the pigments used in the dark and light inkjet inks, the printed image may have intermediate lightfastness and chromatic properties by utilizing mixtures of pigments.

Organic pigments that may be used in the dark inkjet ink or in the light inkjet include, but are not limited to, anthraquinones, phthalocyanine blues, phthalocyanine greens, disazos, monoazos, pyranthrones, perylenes, perinones, carbazoles, diarylides, heterocyclic yellows, benzimidazolones, bisacetoacetarylides, dioxazines, dipyrrolopyrroles, diketopyrrolopyrroles, napthols, quinacridones, quinophthalones, isoindolinones, indanthrones, (thio)indigoids, metal complexes, nitro pigments, and nitroso pigments. In one embodiment, the pigment used in each of the dark inkjet ink and the light inkjet ink is an organic pigment.

Specific examples of organic pigments that may be used are referred to herein by Colour Index ("CI") nomenclature, as known in the art. Examples of phthalocyanine blues include copper phthalocyanine blue and derivatives thereof, such as Pigment Blue 15, Pigment Blue 15:3, and Pigment Blue 15:4. Examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Examples of disazos include Pigment Red 242 and Pigment Yellow 128. Examples of monoazos include Pigment Yellow 1, Pigment Yellow 3, Pigment Yellow 65, Pigment Yellow 73, and Pigment Yellow 74. Examples of anthraquinones include Pigment Red 43, Pigment Red 194 (Perinone Red), Pigment Red 177, Pigment Red 216 (Brominated Pyranthrone Red), and Pigment Red 226 (Pyranthrone Red). Examples of indanthrones include Pigment Blue 60. Examples of perylenes include Pigment Red 123 (Vermillion), Pigment Red 149 (Scarlet), Pigment Red 179 (Maroon), Pigment Red 190 (Red), Pigment Red 189 (Yellow Shade Red), and Pigment Red 224. Examples of thioindigoids include Pigment Red 86, Pigment Red 87, Pigment Red 88, Pigment Red 181, Pigment Red 198, Pigment Violet 36, and Pigment Violet 38. Examples of naphthols include Pigment Red 112. Examples of benzimidazolones include Pigment Yellow 120, Pigment Yellow 151, Pigment Yellow 175, and Pigment Yellow 213. Examples of bisacetoacetarylides include Pigment Yellow 155. Examples of other heterocyclic yellows include Pigment Yellow 12, Pigment Yellow 13, Pigment Yellow 14, Pigment Yellow 17, Pigment Yellow 93, Pigment Yellow 94, Pigment Yellow 109, Pigment Yellow 110, Pigment Yellow 117, Pigment Yellow 138, Pigment Yellow 154, and Pigment Yellow 173. Examples of metal complexes include Pigment Yellow 150 and Pigment Red 257. These pigments are commercially available in either powder or press cake form from a number of sources including, BASF Corp. (Mount Olive, N.J.), Engelhard Corp. (Iselin, N.J.), CIBA Corp. (Tarrytown, N.Y.), Clariant Corp. (Coventry, R.I.), or Sun Chemical Corp. (Cincinnati, Ohio).

The pigment used in the dark inkjet ink or light inkjet ink may be a carbon black pigment, such as a channel black, a furnace black, or a lamp black. Examples of carbon blacks include those sold under the Regal®, Black Pearls®, Elftex®, Monarch®, Mogul®, and Vulcan® trademarks, which are available from Cabot Corporation (Boston, Mass.). The carbon black may include, but is not limited to, Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® L, Elftex® 8, Monarch® 1400, Monarch® 1300, Monarch® 1100, Monarch® 1000, Monarch® 900, Monarch® 880, Monarch® 800, Monarch® 700, Mogul® L, Regal® 330, Regal® 400, Vulcan® P. Other carbon blacks include, but are not limited to, Printex 40, Printex 80, Printex 300, Printex L, Printex U, Printex V, Special Black 4, Special Black 5, FW1, FW2, FW18, and FW200, which are available from Degussa Corporation (Ridgefield, N.J.); Raven 780, Raven 890, Raven 1020, Raven 1040, Raven 1255, Raven 1500, Raven 5000, Raven 5250, which are available from Colombian Chemical Corporation (Atlanta, Ga.)

The inorganic pigment may include, but is not limited to, iron oxides, titanium oxides, zinc oxide, zinc sulphides, zinc chromate, zirconium oxide, iron blue, ultramarine blue, chromium oxide, ultramarine, cobalt blue, cobalt violet, silicon dioxide, nickel oxides, aluminum oxides, ferric ferrocyanide (Prussian blue), lead chromate, white lead, basic lead sulfate, cadmium yellow, chrome yellow, barium sulfate, calcium carbonate, calcium silicate, and manganese violet. The inorganic pigment may be used in the light inkjet ink when it is desired to produce at least a portion of the printed image with extremely low chroma. In one embodiment, the light inkjet ink includes an inorganic pigment in addition to an organic pigment.

Fluorescent pigments may also be used in the dark inkjet ink. Fluorescent pigments in a range of colors are available from a variety of companies, such as Day-Glo (Cleveland, Ohio), Kremer Pigments (New York, N.Y.), and Cleveland Pigment and Color (Akron, Ohio). However, since fluorescent pigments typically have poor lightfastness, the fluorescent pigments may be used in combination with other pigments that have higher lightfastness.

As previously mentioned, the pigments in the dark and light inkjet inks may have dissimilar crystal forms. Many phthalocyanine and quinacridone pigments have multiple, commercially useful, crystal forms. For instance, phthalocyanine blue (Pigment Blue 15:3, Pigment Blue 15:4, etc.) is available in an α, β, or γ crystal form and quinacridones (Pigment Red 122, Pigment Violet 19, etc.) are available in β or γ crystal forms. For the sake of example only, the pigment in the dark inkjet ink may be the γ form of Pigment Violet 19 while the pigment in the light inkjet ink may be the β form of Pigment Violet 19.

Alternatively, the pigments in the dark and light inkjet inks may have dissimilar particle sizes. Pigments having a small particle size are typically more chromatic and less opaque than pigments with a large particle size. Therefore, the pigment in the dark inkjet ink may have a smaller particle size relative to the pigment used in the light inkjet ink. The effect of particle size on chromaticity and lightfastness depends on the type of chromophore in the pigment and the crystallinity of the pigment. Within the yellow pigments, the monoazo yellow pigments may have a minimum particle size difference ($\Delta D_{50}$) of 20 nm between the pigments used in the dark and light inkjet inks. The monoazo yellow pigment used in the dark inkjet ink may have a particle size of greater than or equal to approximately 60 nm. As such, the monoazo yellow pigment used in the light inkjet ink may have a particle size greater than or equal to approximately 80 nm. The disazo or benzimidazolone yellow pigments may also have a minimum $\Delta D_{50}$ of 20 nm between the pigments used in the dark and light inkjet inks. The disazo or benzimidazolone yellow pigments used in the dark inkjet ink may have a particle size of greater than or equal to approximately 20 nm. As such, the disazo or benzimidazolone yellow pigments used in the light inkjet ink may have a particle size of greater than or equal to approximately 40 nm. The bisacetoacetarylide yellow pigments have a minimum $\Delta D_{50}$ of approximately 40 nm between the pigments used in the dark and the light inkjet inks. The bisacetoacetarylide yellow pigments used in the dark inkjet ink may have a particle size of greater than or equal to approximately 50 nm. As such, the bisacetoacetarylide yellow pigments used in the light inkjet ink may have a particle size of greater than or equal to approximately 90 nm. The metal complex Pigment Yellow 150 may have a minimum $\Delta D_{50}$ of 50 nm between the pigments used in the dark and light inkjet inks. The metal complex yellow pigment used in the dark inkjet ink may have a particle size of greater than or equal to approximately 20 nm. As such, the metal complex yellow pigment used in the light inkjet ink may have a particle size of greater than or equal to approximately 70 nm. The minimum $\Delta D_{50}$ and particle size limits described above apply when the dark and light inkjet inks include the same chromophore. However, these limits may not apply when the dark and light inkjet inks include different chromophores.

For the sake of example only, the dark yellow inkjet ink may include a yellow pigment having a particle size of less than approximately 60 nm and the light yellow inkjet ink may include a yellow pigment having a particle size of greater than approximately 80 nm. The yellow pigment in each of the dark and light inkjet inks may have the same or different chromophore, crystal form, or chemical dispersant. In one particular embodiment, a disazo Pigment Yellow 128 having a particle size of approximately 60 nm may be used in the dark inkjet ink and a disazo Pigment Yellow 128 having a particle size of approximately 80 nm may be used in the light inkjet ink. In another embodiment, the dark yellow inkjet ink may include Pigment Yellow 74 having a particle size of greater than approximately 60 nm. The light yellow inkjet ink may include Pigment Yellow 128, Pigment Yellow 155, Pigment Yellow 213, or mixtures thereof having particle sizes of greater than approximately 40 nm, greater than approximately 90 nm, or greater than approximately 40 nm, respectively.

Within the magenta, red, and violet pigments, the quinacridone pigments may have a minimum $\Delta D_{50}$ of 20 nm between the pigments used in the dark and light inkjet inks. The quinacridone pigments used in the dark inkjet ink may have a particle size of greater than or equal to approximately 15 nm and the quinacridone pigments used in the light inkjet ink may have a particle size of greater than or equal to approximately 35 nm. The diketopyrrolopyrrole pigments have a minimum $\Delta D_{50}$ of 30 nm between the pigments used in the dark and light inkjet inks. The diketopyrrolopyrrole pigments in the dark inkjet ink may have a particle size of greater than or equal to approximately 50 nm in the dark inkjet ink and greater than or equal to approximately 80 nm in the light inkjet ink. Out of the high performance cyan pigments, such as phthalocyanine pigments and indanthrone pigments, the minimum $\Delta D_{50}$ is 20 nm between the pigments used in the dark and light inkjet inks. The cyan pigment used in the dark inkjet ink may have a particle size of greater than or equal to approximately 20 nm and greater than or equal to approximately 40 nm in the light inkjet ink.

The magenta, red, or violet pigment in each of the dark and light inkjet inks may have the same or different chromophore, crystal form, or chemical dispersant. The dark magenta inkjet ink may include a pigment having a quinacridone chromophore and a particle size of less than approximately 50 nm and the light magenta inkjet ink may include a pigment having a quinacridone chromophore and a particle size of greater than approximately 70 nm. For instance, a Pigment Red 122 having a quinacridone chromophore and a particle size of approximately 25 nm may be used in the dark inkjet ink and a Pigment Red 122 having a quinacridone chromophore and a particle size of approximately 60 nm may be used in the light inkjet ink. Alternatively, a diketopyrrolopyrrole Pigment Red 254 having a particle size of approximately 50 nm may be used in the dark inkjet ink and a diketopyrrolopyrrole Pigment Red 254 having a particle size of approximately 100 nm may be used in the light inkjet ink.

Within cyan pigments, a cyan pigment having a copper phthalocyanine chromophore and a particle size of less than approximately 50 nm may be used in the dark inkjet ink and a cyan pigment having a copper phthalocyanine chromophore and a particle size of greater than or equal to approximately 60 nm may be used in the light inkjet ink. Alternatively, the dark cyan inkjet ink may include a pigment that has a copper phthalocyanine chromophore and a particle size of less than approximately 50 nm and the light cyan inkjet ink may include a pigment that has an aluminum phthalocyanine chromophore and a particle size of greater than or equal to approximately 60 nm. In one embodiment, Pigment Blue 15:3 having a particle size of approximately 40 nm may be used in the dark inkjet ink and Pigment Blue 15:3 having a particle size of approximately 60 nm may be used in the light inkjet ink.

In black inkjet inks, the colorant may be present at a concentration of approximately 2% to approximately 5% in the form of carbon black. At such high concentrations, black regions of an image printed with the inkjet ink usually exhibit extremely high lightfastness. When lightfastness failures do occur, it is typically because the black region has been printed using composite black, which is a mixture of K, C, M, and Y inkjet inks, and the failure is due to a failure in the C, M, or Y colorant. Thus, in black and grey inkjet inks, the particle size difference between the carbon black pigments used in the dark and light inkjet inks is less critical. However, because of hue shifts associated with diluting carbon black pigments, grey inkjet inks are typically adjusted with color pigments to maintain a neutral hue. In particular, cyan, blue, violet, and magenta pigments may be added to the grey inkjet ink to achieve neutrality. If these color pigments are used in the grey inkjet ink, the particle size and $\Delta D_{50}$ size limits described above for each of these color pigments may be used.

If the same chromophore is used in both of the light and dark inkjet inks, the particle size, crystal form, chemical dispersant, or combinations thereof of the pigments may be dissimilar, as previous mentioned. In this situation, the pigment in the light and dark inkjet inks may be Pigment Yellow 128, Pigment Yellow 155, Pigment Yellow 213, Pigment Violet 19 ($\gamma$-modification), Pigment Red 122, Pigment Red 254, Pigment Blue 15:3, or Pigment Blue 15:4. When the particle size of these pigments is small, such as approximately 50 nm or less, the lightfastness of most of these pigments is reduced by approximately 1 unit on the blue wool scale compared to its lightfastness value if the particle size were larger, such as greater than approximately 50 nm. In the case of the lightfastness of Pigment Violet 19, the $\gamma$-modification is sensitive to particle size, whereas the $\beta$-modification is relatively insensitive.

The pigments in the dark and light inkjet ink may also utilize dissimilar chromophores to achieve the desired chromatic and lightfastness properties. The chromophore of the dark inkjet ink and the light inkjet ink may be independently selected from anthraquinone, phthalocyanine blue, phthalocyanine green, disazo, monoazo, pyranthrone, perylene, perinone, carbazole, diarylide, heterocyclic yellow, benzimidazolone, bisacetoacetarylide, dioxazine, dipyrrolopyrrole, diketopyrrolopyrrole, napthol, quinacridone, quinophthalone, isoindolinone, indanthrone, (thio)indigoid, metal complex, nitro, and nitroso chromophores.

The dissimilar chromophores in the dark and light inkjet inks may be achieved by selecting chromophores from different classes out of the chromophores listed above. For instance, the dark inkjet ink may include a monoazo type yellow chromophore and the light inkjet ink may include a benzimidazolone type yellow chromophore. Alternatively, the dissimilar chromophores may be achieved by utilizing a chromophore from one class of the chromophores listed above but that differs in the substituents on the chromophore. In addition, different salt forms of the chromophore may be used. For instance, if a quinacridone chromophore is used in both the dark and light inkjet inks, the quinacridone chromophore in each of the dark and light inkjet inks may have different substituents. Alternatively, a copper phthalocyanine chromophore may be used in the dark inkjet ink while an aluminum phthalocyanine chromophore may be used in the light inkjet ink.

The blue wool scale may be used to select the pigments used in the dark and light inkjet inks. The blue wool scale is a conventional standard known in the art to characterize the lightfastness of colorants, such as pigments. The blue wool scale has eight blue wool lightfastness values that range from 1 (fugitive) to 8 (extremely lightfast). There is an approximately two times difference in lightfastness between adjacent values on the blue wool scale. In other words, a pigment having a lightfastness value of 8 on the blue wool scale is approximately two times more lightfast than a pigment having a lightfastness value of 7. The pigment in the light ink may have a lightfastness value on the blue wool scale that is at least one unit greater than that of the pigment in the dark inkjet ink. However, the difference in lightfastness values between the pigments used in the light inkjet ink and the dark inkjet ink may be less than or equal to 2 units on the blue wool scale. In other words, the pigments used in the light and dark inkjet inks may differ in their lightfastness value from 1 unit to 2 units on the blue wool scale.

The lightfastness of the pigment in the dark inkjet ink may range from 6 to 7 on the blue wool scale. Examples of pigments within this range include, but are not limited to, Pigment Yellow 3, Pigment Yellow 16, Pigment Yellow 73, Pigment Yellow 74, Pigment Yellow 81, Pigment Yellow 83, Pigment Yellow 93, Pigment Yellow 97, Pigment Yellow 110, Pigment Yellow 180, Pigment Yellow 194, Pigment Red 112, Pigment Red 170, Pigment Red 175, Pigment Red 188, Pigment Red 209, Pigment Red 253, and Pigment Red 256. The pigment dispersion in the dark inkjet ink may also be resistant to organic solvents and other chemicals, which is indicated by the pigment's ability to be stably dispersed in the inkjet ink. The pigments described above are resistant to organic solvents and other chemicals. These pigments also have particle sizes at or less than approximately 150 nm and have narrow particle size distributions, which further contributes to the high chroma and high color strength of images printed with the dark inkjet ink. Since these pigments exhibit highly chromatic shades and chemical resistance, they may be used in the dark inkjet ink.

The pigment used in the light inkjet ink may exhibit good resistance to lightfade and gasfade. Typically, pigments that are fade resistant are also less chromatic. The lightfastness of the pigment in the light inkjet ink may range in value from 7 to 8 on the blue wool scale. Examples of pigments within this range include, but are not limited to, Pigment Yellow 120, Pigment Yellow 128, Pigment Yellow 150, Pigment Yellow 151, Pigment Yellow 154, Pigment Yellow 155, Pigment Yellow 173, Pigment Yellow 213, Pigment Red 168, Pigment Red 177, Pigment Red 202, Pigment Red 206, Pigment Red 207, Pigment Red 214, Pigment Red 242, Pigment Red 257, Pigment Red 122, Pigment Violet 19 (β-modification), Pigment Violet 23, Pigment Blue 15:3, Pigment Blue 15:4, Pigment Blue 60, Pigment Green 7, and Pigment Green 36. Each of the yellow pigments has a different chromophore and has a particle size of less than approximately 150 nm.

Some pigments may be used in either the dark or light inkjet inks, depending on the pigment's crystal form or particle size. For instance, appropriate forms of Pigment Yellow 128, Pigment Yellow 155, Pigment Yellow 213, Pigment Violet 19 (γ-modification), Pigment Red 122, Pigment Red 254, Pigment Blue 15:3, or Pigment Blue 15:4 may be used in either the dark or light inkjet inks. Pigment Blue 15:3 and Pigment Blue 15:4 are the β-modification of copper phthalocyanine blue, which is the thermodynamically most stable crystal form. Pigment Blue 15:4 is surfaced-treated to improve its stability towards flocculation. When the particle size of these pigments is small, such as approximately 50 nm or less, the lightfastness of most of these pigments is reduced by approximately 1 unit on the blue wool scale. In the case of the lightfastness of Pigment Violet 19, the γ-modification is sensitive to particle size, whereas the β-modification is relatively insensitive. If appropriate forms of these pigments are used, they may be used with the pigments previously identified and described for use in the dark inkjet ink or in the light inkjet ink. In other words, small particle size versions of these pigments, which are less lightfast and have a blue wool scale value ranging from 6 to 7, may be used in the dark inkjet inks in combination with the more lightfast pigments having a blue wool scale value ranging from 7 to 8. Similarly, the larger particle size, highly lightfast forms of these pigments, which have a blue wool scale value ranging from 7 to 8, may be used in the light inkjet inks in combination with the highly chromatic, less lightfast pigments having a blue wool scale value ranging from 6 to 7.

For the sake of example only, monoazo type Pigment Yellow 74 having a particle size of approximately 80 nm and a lightfastness value ranging from 6 to 7 on the blue wool scale may be used in the dark inkjet ink while benzimidazolone type Pigment Yellow 213 having a particle size of approximately 80 nm and a lightfastness value of 8 on the blue wool scale may be used in the light inkjet ink. In another example, Pigment Yellow 93 having a particle size of approximately 100 nm and a lightfastness value of 7 on the blue wool scale may be used in the dark inkjet ink and Pigment Yellow 128 having a particle size of approximately 80 nm and a lightfastness value of 8 on the blue wool scale may be used in the light inkjet ink. In another example, Pigment Red 202 having a particle size of approximately 100 nm and a lightfastness value of 8 on the blue wool scale may be used in the light inkjet ink and Pigment Red 209 having a particle size of approximately 60 nm and a lightfastness value of 7 on the blue wool scale may be used in the dark inkjet ink.

To form the dark and light inkjet inks, the pigments may be dispersed in an aqueous medium or ink vehicle, as known in the art. The pigment may be stably dispersed using a surfactant or the chemical dispersant. The pigment may also be dispersed by covalently attaching polymeric or organic groups to a surface of the pigment. These pigments are referred to in the art as "self-dispersed pigments" or "polymer-attached pigments." The pigment may be present in the dark inkjet ink in an amount or concentration ranging from approximately 1.0% by weight ("wt %") of a total weight of the dark inkjet ink to approximately 10 wt % of the total weight of the dark inkjet ink. For instance, the pigment may be present from approximately 2.0 wt % of the total weight of the dark inkjet ink to approximately 5 wt % of the total weight of the dark inkjet ink.

The light inkjet ink may also be formed by diluting the dark inkjet ink. Alternatively, the light inkjet ink may be formed by dispersing a lower amount of the pigment in an ink vehicle. The pigment may be present in the light inkjet ink in an amount or concentration ranging from approximately 0.05 wt % of the total weight of the light inkjet ink to approximately 5 wt % of the total weight of the light inkjet ink.

The dark and light inkjet inks may also include water and water-soluble or water-miscible organic solvents, as known in the art. Organic solvents for use in the dark and light inkjet inks may be selected by one of ordinary skill in the art and, therefore, are not described in detail herein. The inkjet ink may include from approximately 5 wt % to approximately 60 wt % of the organic solvents. Depending on the desired properties of the inkjet ink, the dark and light inkjet inks may include optional ingredients including, but not limited to, pH adjusting agents, surfactants, dispersants, penetrating agents, ultraviolet light absorbers, preservatives, antioxidants, corrosion inhibitors, and viscosity modifiers. These ingredients are known to those of ordinary skill in the art and, therefore, are not described in detail herein. If optional ingredients are to be included in the dark and light inkjet inks, they may be added to the ink vehicle and mixed to form the inkjet inks.

The dark inkjet ink and the light inkjet ink of a particular color may be deposited on the print medium to produce tones of a desired color. To achieve the desired color, the dark and light inkjet inks may be applied to the print medium in relative proportions that are determined by a print driver. Techniques for achieving the desired color are known in the art and, as such, are not described in detail herein. The dark and light inkjet inks may produce tones of the desired color that are high chromatic and are lightfast. As such, the printed image may have low inherent graininess and reduced differential lightfade, producing the printed image with photographic quality.

To produce lightfast yellow tones in the printed image, a dark yellow inkjet ink and a light yellow inkjet ink may be applied to the print medium. In one embodiment, the light yellow inkjet ink includes Pigment Yellow 128, Pigment Yellow 155, Pigment Yellow 213, or mixtures thereof and the dark yellow inkjet ink includes Pigment Yellow 74. Each of these yellow pigments differs in their chromophore. The dark inkjet ink may include approximately 4.0% of Pigment Yellow 74 while the light inkjet ink may include approximately 2.0% of Pigment Yellow 128 and Pigment Yellow 213. When the printed image is exposed to visible light, such as conventional indoor lighting conditions, noticeable fade may occur in regions printed with the dark yellow inkjet ink in approximately 20 years while regions printed with the light yellow inkjet ink may exhibit noticeable fade in approximately 50 years. As such, the printed image may fade after 20 years.

In comparison, if Pigment Yellow 74 is used as the pigment in both the dark inkjet ink and the light inkjet ink, noticeable fade may occur in the dark yellow regions in approximately 20 years while the light yellow regions would fade much sooner, such as in approximately 10 years. As such, fade may occur after 10 years. In this situation, the dark inkjet ink may include approximately 4.0% of Pigment Yellow 74 while the light inkjet ink may include approximately 1.6% of Pigment Yellow 74. A lower concentration (1.6%) of the pigment in this light inkjet ink may be used to compensate for its greater chromaticity compared to the concentration of pigment (2.0%) used in the light inkjet ink of the present invention. By replacing the pigment used in this light inkjet ink with a pigment having less chromaticity and increased lightfastness, as in the light inkjet ink of the present invention, an effective life of the printed image may be increased from 10 years to at least 20 years, which is the lightfastness of the dark inkjet ink. Therefore, the lightfastness of the printed image is no longer limited by the light inkjet ink but instead may be determined by the fade characteristics of the dark inkjet ink.

To produce lightfast magenta tones in the printed image, a dark magenta inkjet ink and a light magenta inkjet ink may be applied to the print medium. The chromophore of the pigment used in each of the inkjet inks may be a quinacridone chromophore. Therefore, the dissimilar chromatic and lightfastness properties of the dark and light inkjet inks may be provided by at least one of the magenta pigment's crystal form, chemical dispersant, or particle size. The quinacridone pigment in the dark magenta inkjet ink may have a small particle size, such as a particle size of approximately 25 nm, while the quinacridone pigment in the light magenta inkjet ink may have a large particle size, such as a particle size of greater than approximately 50 nm. In one embodiment, the dark magenta inkjet ink includes Pigment Red 122 having a particle size of 25 nm and the light magenta inkjet ink includes Pigment Red 122 having a particle size of greater than approximately 50 nm. In another embodiment, the quinacridone pigment in the dark magenta inkjet ink includes the β-modification of Pigment Violet 19 and the light magenta inkjet ink includes Pigment Red 122.

To produce lightfast cyan tones in the printed image, a dark cyan inkjet ink and a light cyan inkjet ink may be applied to the print medium. The chromophore of the pigment used in each of the inkjet inks may be a phthalocyanine chromophore. Therefore, the dissimilar chromatic and lightfastness properties may be provided by at least one of the cyan pigment's crystal form, particle size, or means of chemical dispersion. In one embodiment, a copper phthalocyanine pigment having a particle size of 40 nm is used in the dark cyan inkjet ink and a copper phthalocyanine pigment having a particle size greater than approximately 60 nm is used in the light cyan inkjet ink. In another embodiment, an aluminum phthalocyanine pigment having a particle size of approximately 60 nm is used in the dark cyan inkjet ink and a copper phthalocyanine pigment having a particle size greater than approximately 80 nm is used in the light cyan inkjet ink. In another embodiment, Pigment Blue 15:3 having a particle size of approximately 30 nm is used in the dark cyan inkjet ink and Pigment Blue 60 having a particle size of approximately 50 nm is used in the light cyan inkjet ink.

To produce lightfast red tones in the printed image, a dark red inkjet ink and a light red inkjet ink may applied to the print medium. The chromophore of the pigment used in each of the inkjet inks may be a diketopyrrolopyrrole chromophore. Therefore, the dissimilar chromatic and lightfastness properties of the dark and light inkjet inks may be provided by at least one of the red pigment's crystal form, particle size, or chemical dispersant. The diketopyrrolopyrrole pigment in the dark red inkjet ink may have a small particle size, such as a particle size of approximately 50 nm, while the diketopyrrolopyrrole pigment in the light red inkjet ink may have a large particle size, such as a particle size of approximately 100 nm. In one embodiment, the dark red inkjet ink includes Pigment Red 254 having a particle size of approximately 50 nm and the light red inkjet ink includes Pigment Red 254 having a particle size of approximately 100 nm.

To produce lightfast black tones in the printed image, a dark black inkjet ink and a light black (grey) inkjet ink may be applied to the print medium. Carbon black may be used as the pigment in the dark black inkjet ink. The carbon black may be any carbon black known in the art. The light black (grey) inkjet ink may include the same pigment and may be produced by diluting the dark black inkjet ink with water or organic solvents. However, diluting the dark black inkjet ink may lead to hue shifts towards brownish-yellow. To compensate for the hue shifts and provide a neutral, light black (grey) inkjet ink, cyan pigments, blue pigments, violet pigments, magenta pigments, or mixtures thereof may be used in the light black (grey) inkjet ink. These cyan, blue, violet, or magenta pigments may have high lightfastness properties and low chromatic properties and, as such, may have large particle sizes, as previously described.

The ink set of the present invention may provide photographic quality images or near photographic quality images when deposited on a plain paper or a specialty print medium. The plain paper may be a conventional plain paper for use in inkjet printing, such as Gilbert Bond, Georgia-Pacific Multi-System®, Aussedat-Rey-Reymat, Champion DataCopy, Enso-Gutzeit Berga Laser, Hammermill® Fore DP, Honshu New Yamayuri, Hokuestsu kin-Mari, KymCopy Lux, MoDo DataCopy, Neenah Classic Laid, Oji Sunace PPC, Stora Papyrus MultiCopy, Union Camp Great White®, Weyerhauser First Choice®, or Wiggens Teape Conqueror®. The specialty print medium may include, but is not limited to, a glossy print medium, such as HP Premium Plus Photo printer paper, which is available from Hewlett-Packard Co. (Palo Alto, Calif.), Epson photo paper, Pictorico premium photo glossy, Agfa glossy photo inkjet paper, Konica photo inkjet paper, Canon glossy photo paper, Hammermill® Jetprint Ultra Gloss, Polaroid inkjet paper, and Kodak inkjet photo quality-photo weight paper The following examples serve to explain embodiments of the present invention in more detail. These examples are not to be construed as being exhaustive or exclusive as to the scope of this invention.

EXAMPLES

Example 1

Formulation of Dark and Light Inkjet Inks

Dark and light inkjet inks utilizing the combinations of pigments shown in Tables 1-4 are prepared.

TABLE 1

Pigment Combinations for Dark and Light Black Inkjet Inks.

| Color | Light inkjet ink | Dark inkjet ink |
|---|---|---|
| Black (Grey) | Dense carbon black, 50 nm primary particle size, 120 nm aggregate size. Hue adjusted with 80 nm Pigment Violet 19 (β-form). | Any carbon black pigment, no hue adjustment necessary. |
| | Dense carbon black, 50 nm primary particle size, 120 nm aggregate size. Hue adjusted with 100 nm Pigment Blue 15:3. | Any carbon black pigment, no hue adjustment necessary. |
| | Dense carbon black, 50 nm primary particle size, 120 nm aggregate size. Hue adjusted with 80 nm Pigment Blue 60. | Any carbon black pigment, no hue adjustment necessary. |
| | Dense carbon black, 50 nm primary particle size, 120 nm aggregate size. Hue adjusted with 50 nm Pigment Red 122 and 80 nm Pigment Blue 15:3. | Any carbon black pigment, no hue adjustment necessary. |

TABLE 2

Pigment Combinations for Dark and Light Cyan Inkjet Inks.

| Color | Light inkjet ink | Dark inkjet ink |
|---|---|---|
| Cyan | 80 nm Pigment Blue 60. | 40 nm copper phthalocyanine (Pigment Blue 15:3 or 15:4) or aluminum phthalocyanine. |
| | 50 nm Pigment Blue 15:3. | 30 nm Pigment Blue 15:3. |
| | 60 nm Pigment Blue 60. | 80 nm Pigment Blue 15:3. |

TABLE 3

Pigment Combinations for Dark and Light Magenta Inkjet Inks.

| Color | Light inkjet ink | Dark inkjet ink |
|---|---|---|
| Magenta | 60 nm Pigment Red 122. | 25 nm Pigment Red 122. |
| | 100 nm Pigment Violet 19 (β-modification). | 30 nm Pigment Red 122. |
| | 80 nm Pigment Red 122. | 40 nm Pigment Violet 19 (γ-modification). |
| | 100 nm Pigment Violet 19 (β-modification) | 50 nm Pigment Violet 19 (γ-modification) |

TABLE 4

Pigment Combinations for Dark and Light Yellow Inkjet Inks

| Yellow | 80 nm Pigment Yellow 128. | 50 nm Pigment Yellow 128. |
|---|---|---|

TABLE 4-continued

Pigment Combinations for Dark and Light Yellow Inkjet Inks

| | 60 nm Pigment Yellow 213. | 100 nm Pigment Yellow 74. |
|---|---|---|
| | 120 nm Pigment Yellow 74. | 60 nm Pigment Yellow 74. |
| | 90 nm Pigment Yellow 155. | 100 nm Pigment Yellow 74. |

The inkjet inks described in Tables 1-4 are formulated as known in the art.

The dark and light inkjet inks described in Example 1 are printed on HP Premium Plus Photo paper. The resulting printed images will show reduced differential lightfade and graininess, and will provide printed images having near photographic print quality.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An ink set providing reduced differential lightfade and reduced graininess, comprising:
   at least one dark inkjet ink comprising at least one pigment having a high chromaticity and a low lightfastness; and
   at least one light inkjet ink having the same color as at least one said dark inkjet ink, and comprising at least one pigment having a high lightfastness and a low chromaticity,
   wherein the at least one pigment in the at least one dark inkjet ink differs in at least one of crystal form, particle size, chromophore, and attached chemical dispersant from the at least one pigment in the at least one light inkjet ink.

2. The ink set of claim 1, wherein the at least one pigment in the at least one light inkjet ink has a lightfastness value that is one unit greater on the blue wool scale than the lightfastness value of the at least one pigment in the at least one dark inkjet ink.

3. The ink set of claim 1, wherein the at least one pigment in the at least one dark inkjet ink has a lightfastness value ranging from 6 to 7 on the blue wool scale and the at least one pigment in the at least one light inkjet ink has a lightfastness value ranging from 7 to 8 on the blue wool scale.

4. The ink set of claim 1, wherein the at least one pigment in the at least one dark inkjet ink and in the at least one light inkjet ink has a chromophore independently selected from the group consisting of anthraquinones, phthalocyanine blues, phthalocyanine greens, disazos, monoazos, pyranthrones, perylenes, perinones, carbazoles, diarylides, heterocyclic yellows, bisacetoacetarylides, benzimidazolones, dioxazines, dipyrrolopyrroles, diketopyrrolopyrroles, napthols, quinacridones, quinophthalones, isoindolinones, indanthrones, (thio)indigoids, metal complexes, nitro pigments, and nitroso chromophores.

5. The ink set of claim 1, wherein the at least one pigment in the at least one dark inkjet ink is selected from the group consisting of Pigment Yellow 3, Pigment Yellow 16, Pigment Yellow 73, Pigment Yellow 74, Pigment Yellow 81, Pigment Yellow 83, Pigment Yellow 93, Pigment Yellow 97, Pigment Yellow 110, Pigment Yellow 180, Pigment Yellow 194, Pigment Red 112, Pigment Red 170, Pigment Red 175, Pigment Red 188, Pigment Red 209, Pigment Red 253, Pigment Red 256, Pigment Yellow 128, Pigment Yellow 155, Pigment Yellow 213, Pigment Violet 19 (γ-modification), Pigment Red 122, Pigment Red 254, Pigment Blue 15:3, and Pigment Blue 15:4.

6. The ink set of claim 1, wherein the at least one pigment in the at least one light inkjet ink is selected from the group consisting of Pigment Yellow 120, Pigment Yellow 128, Pigment Yellow 150, Pigment Yellow 151, Pigment Yellow 154, Pigment Yellow 155, Pigment Yellow 173, Pigment Yellow 213, Pigment Red 177, Pigment Red 202, Pigment Red 206, Pigment Red 207, Pigment Red 214, Pigment Red 242, Pigment Red 257, Pigment Red 122, Pigment Violet 19 (β-modification), Pigment Violet 23, Pigment Blue 15:3, Pigment Blue 15:4, Pigment Green 7, Pigment Green 36, Pigment Yellow 128, Pigment Yellow 155, Pigment Yellow 213, Pigment Violet 19 (γ-modification), Pigment Red 122, Pigment Red 254, Pigment Blue 15:3, and Pigment Blue 15:4.

7. The ink set of claim 1, wherein the at least one dark inkjet ink comprises at least one of a dark cyan, dark yellow, and dark magenta inkjet ink.

8. The ink set of claim 1, wherein the at least one light inkjet ink comprises at least one of a light cyan, light yellow, and light magenta inkjet ink.

9. The ink set of claim 1, wherein the at least one dark inkjet ink comprises a monoazo yellow pigment having a particle size of greater than or equal to approximately 60 nm and the at least one light inkjet ink comprises a monoazo yellow pigment having a particle size of greater than or equal to approximately 80 nm.

10. The ink set of claim 1, wherein the at least one dark inkjet ink comprises a disazo or benzimidazolone yellow pigment having a particle size of greater than or equal to approximately 20 nm and the at least one light inkjet ink comprises a disazo or benzimidazolone yellow pigment having a particle size of greater than or equal to approximately 40 nm.

11. The ink set of claim 1, wherein the at least one dark inkjet ink comprises a metal complex yellow pigment having a particle size of greater than or equal to approximately 20 nm and the at least one light inkjet ink comprises a metal complex yellow pigment having a particle size of greater than or equal to approximately 70 nm.

12. The ink set of claim 1, wherein the at least one dark inkjet ink comprises Pigment Yellow 128 having a particle size of approximately 60 nm and the light inkjet ink comprises Pigment Yellow 128 having a particle size of approximately 80 nm.

13. The ink set of claim 1, wherein the at least one dark inkjet ink comprises Pigment Yellow 74 having a particle size of greater than approximately 60 nm and the at least one light inkjet ink comprises Pigment Yellow 128, Pigment Yellow 155, Pigment Yellow 213, or mixtures thereof having particle sizes of greater than approximately 40 nm, 90 nm, and 40 nm, respectively.

14. The ink set of claim 1, wherein the at least one dark inkjet ink comprises Pigment Yellow 74 having a particle size of approximately 80 nm and a lightfastness value ranging from 6 to 7 on the blue wool scale and the at least one light inkjet ink comprises Pigment Yellow 213 having a particle size of approximately 80 nm and a lightfastness value of 8 on the blue wool scale.

15. The inkjet ink of claim 1, wherein the at least one dark inkjet ink comprises Pigment Yellow 93 having a particle size of approximately 100 nm and a lightfastness value of 7 on the blue wool scale and the at least one light inkjet ink comprises Pigment Yellow 128 having a particle size of approximately 80 nm and a lightfastness value of 8 on the blue wool scale.

16. The ink set of claim 1, wherein the at least one dark inkjet ink comprises a phthalocyanine chromophore or an indanthrone chromophore having a particle size of greater than or equal to approximately 20 nm and the at least one light inkjet ink comprises a phthalocyanine chromophore or an indanthrone chromophore having a particle size of greater than or equal to approximately 40 nm.

17. The ink set of claim 1, wherein the at least one dark inkjet ink comprises a copper phthalocyanine pigment having a particle size of less than approximately 50 nm and the at least one light inkjet ink comprises a copper phthalocyanine pigment having a particle size of greater than or equal to approximately 60 nm.

18. The ink set of claim 1, wherein the at least one dark inkjet ink comprises a copper phthalocyanine pigment having a particle size of less than approximately 50 nm and the at least one light inkjet ink comprises an aluminum phthalocyanine pigment having a particle size of greater than or equal to approximately 60 nm.

19. The ink set of claim 1, wherein the at least one dark inkjet ink comprises an aluminum phthalocyanine pigment having a particle size of approximately 60 nm and the at least one light inkjet ink comprises a copper phthalocyanine pigment having a particle size of greater than or equal to approximately 80 nm.

20. The ink set of claim 1, wherein the at least one dark inkjet ink comprises Pigment Blue 15:3 having a particle size of approximately 40 nm and the at least one light inkjet ink comprises Pigment Blue 15:3 having a particle size of approximately 60 nm.

21. The ink set of claim 1, wherein the at least one dark inkjet ink comprises Pigment Blue 15:3 having a particle size of approximately 30 nm and the at least one light inkjet ink comprises Pigment Blue 60 having a particle size of approximately 50 nm.

22. The ink set of claim 1, wherein the at least one dark inkjet ink comprises a quinacridone pigment having a particle size of greater than or equal to approximately 15 nm and the at least one light inkjet ink comprises a quinacridone pigment having a particle size of greater than or equal to approximately 35 nm.

23. The ink set of claim 1, wherein the at least one dark inkjet ink comprises a diketopyrrolopyrrole pigment having a particle size of greater than or equal to approximately 50 nm and the at least one light inkjet ink comprises a diketopyrrolopyrrole pigment having a particle size of greater than or equal to approximately 80 nm.

24. The ink set of claim 1, wherein the at least one dark inkjet ink comprises a diketopyrrolopyrrole pigment having a particle size of approximately 50 nm and the at least one light inkjet ink comprises a diketopyrrolopyrrole pigment having a particle size of approximately 100 nm.

25. The ink set of claim 1, wherein the at least one dark inkjet ink comprises a quinacridone pigment having a particle size of less than approximately 50 nm and the at least one light inkjet ink comprises a quinacridone pigment having a particle size of greater than approximately 70 nm.

26. The ink set of claim 1, wherein the at least one dark inkjet ink comprises Pigment Red 122 having a particle size of approximately 25 nm and the at least one light inkjet ink comprises Pigment Red 122 having a particle size of approximately 60 nm.

27. The ink set of claim 1, wherein the at least one dark inkjet ink comprises Pigment Red 254 having a particle size of approximately 50 nm and the at least one light inkjet ink comprises Pigment Red 254 having a particle size of approximately 100 nm.

28. The ink set of claim 1, wherein the at least one dark inkjet ink comprises Pigment Red 122 having a particle size of less than approximately 50 nm and the at least one light inkjet ink comprises Pigment Red 122 having a particle size of greater than approximately 50 nm.

29. The inkjet ink of claim 1, wherein the at least one light inkjet ink comprises Pigment Red 202 having a particle size of approximately 100 nm and a lightfastness value of 8 on the blue wool scale and the at least one dark inkjet ink comprises Pigment Red 209 having a particle size of approximately 60 nm and a lightfastness value of 7 on the blue wool scale.

30. The ink set of claim 1, wherein the at least one dark inkjet ink comprises a γ form of Pigment Violet 19 and the at least one light inkjet ink comprises a β form of Pigment Violet 19.

31. The ink set of claim 1, wherein the at least one dark inkjet ink comprises a β form of Pigment Violet 19 and the at least one light inkjet ink comprises Pigment Red 122.

32. The ink set of claim 1, further comprising a dark black inkjet ink and a light black inkjet ink.

33. An ink set providing reduced differential lightfade and reduced graininess, comprising:
at least one dark inkjet ink, each dark inkjet ink comprising at least one pigment having a high chromaticity and a low lightfastness, wherein the at least one pigment in the at least one dark inkjet ink has a lightfastness value ranging from 6 to 7 on the blue wool scale;
at least one light inkjet ink, having the same color as at least one said dark inkjet ink, and each light inkjet ink comprising at least one pigment having a high lightfastness and less chromaticity, wherein the at least one pigment in the at least one light inkjet ink has a lightfastness value ranging from 7 to 8 on the blue wool scale; and
a dark black inkjet ink;
wherein the at least one pigment in the at least one dark inkjet ink differs in at least one of crystal form, particle size, chromophore, and attached chemical dispersant compared to the at least one pigment in the at least one light inkjet ink.

34. A method of reducing differential lightfade and graininess in a printed image, comprising:
applying at least one dark inkjet ink to a print medium, the at least one dark inkjet ink comprising at least one highly chromatic pigment and a low lightfastness; and
applying at least one light inkjet ink to the print medium, the at least one light inkjet ink having the same color as at least one dark inkjet ink, and comprising at least one less chromatic pigment having a high lightfastness,
wherein the at least one pigment in the at least one dark inkjet ink differs in at least one of crystal form, particle size, chromophore, and attached chemical dispersant compared to the at least one pigment in the at least one light inkjet ink.

35. The method of claim 34, wherein applying at least one dark inkjet ink to a print medium comprises applying at least one of a dark cyan, dark yellow, and dark magenta inkjet ink to the print medium.

36. The method of claim 34, wherein applying at least one light inkjet ink to the print medium comprises applying the at least one light inkjet ink having a lightfastness value that is one unit greater on the blue wool scale than the lightfastness value of the at least one pigment in the at least one dark inkjet ink.

37. The method of claim 34, wherein applying at least one dark inkjet ink to a print medium comprises applying the at least one dark inkjet ink having a lightfastness value ranging from 6 to 7 on the blue wool scale.

38. The method of claim 34, wherein applying at least one light inkjet ink to the print medium comprises applying the at least one light inkjet ink having a lightfastness value ranging from 7 to 8 on the blue wool scale.

39. The method of claim 34, wherein applying at least one dark inkjet ink or at least one light inkjet ink to a print medium comprises applying at least one dark inkjet ink or at least one light inkjet ink having a chromophore independently selected from the group consisting of anthraquinones, phthalocyanine blues, phthalocyanine greens, disazos, monoazos, pyranthrones, perylenes, perinones, carbazoles, diarylides, heterocyclic yellows, bisacetoacetarylides, benzimidazolones, dioxazines, dipyrrolopyrroles, diketopyrrolopyrroles, napthols, quinacridones, quinophthalones, isoindolinones, indanthrones, (thio)indigoids, metal complexes, nitro pigments, and nitroso chromophores.

40. The method of claim 34, wherein applying at least one dark inkjet ink to a print medium comprises applying at least one dark inkjet ink having at least one pigment selected from the group consisting of Pigment Yellow 3, Pigment Yellow 16, Pigment Yellow 73, Pigment Yellow 74, Pigment Yellow 81, Pigment Yellow 83, Pigment Yellow 93, Pigment Yellow 97, Pigment Yellow 110, Pigment Yellow 180, Pigment Yellow 194, Pigment Red 112, Pigment Red 170, Pigment Red 175, Pigment Red 188, Pigment Red 209, Pigment Red 253, Pigment Red 256, Pigment Yellow 128, Pigment Yellow 155, Pigment Yellow 213, Pigment Violet 19 (γ-modification), Pigment Red 122, Pigment Red 254, Pigment Blue 15:3, and Pigment Blue 15:4.

41. The method of claim 34, wherein applying at least one light inkjet ink to the print medium comprises applying at least one light inkjet ink comprising at least one pigment selected from the group consisting of Pigment Yellow 120, Pigment Yellow 128, Pigment Yellow 150, Pigment Yellow 151, Pigment Yellow 154, Pigment Yellow 155, Pigment Yellow 173, Pigment Yellow 213, Pigment Red 177, Pigment Red 202, Pigment Red 206, Pigment Red 207, Pigment Red 214, Pigment Red 242, Pigment Red 257, Pigment Red 122, Pigment Violet 19 (β-modification), Pigment Violet 23, Pigment Blue 15:3, Pigment Blue 15:4, Pigment Green 7, Pigment Green 36, Pigment Yellow 128, Pigment Yellow 155, Pigment Yellow 213, Pigment Violet 19 (γ-modification), Pigment Red 122, Pigment Red 254, Pigment Blue 15:3, and Pigment Blue 15:4.

42. The method of claim 34, wherein the at least one dark inkjet ink comprises a monoazo yellow pigment having a particle size of greater than or equal to approximately 60 nm and the at least one light inkjet ink comprises a monoazo yellow pigment having a particle size of greater than or equal to approximately 80 nm.

43. The method of claim 34, wherein the at least one dark inkjet ink comprises a disazo or benzimidazolone yellow pigment having a particle size of greater than or equal to approximately 20 nm and the at least one light inkjet ink comprises a disazo or benzimidazolone yellow pigment having a particle size of greater than or equal to approximately 40 nm.

44. The method of claim 34, wherein the at least one dark inkjet ink comprises a metal complex yellow pigment having a particle size of greater than or equal to approximately 20 nm and the at least one light inkjet ink comprises a metal complex yellow pigment having a particle size of greater than or equal to approximately 70 nm.

45. The method of claim 34, wherein the at least one dark inkjet ink comprises Pigment Yellow 128 having a particle size of approximately 60 nm and the light inkjet ink comprises Pigment Yellow 128 having a particle size of approximately 80 nm.

46. The method of claim 34, wherein the at least one dark inkjet ink comprises Pigment Yellow 74 having a particle size of less than approximately 60 nm and the at least one light inkjet ink comprises Pigment Yellow 128, Pigment Yellow 155, Pigment Yellow 213, or mixtures thereof having particle sizes of greater than approximately 40 nm, 90 nm, and 40 nm, respectively.

47. The method of claim 34, wherein the at least one dark inkjet ink comprises Pigment Yellow 74 having a particle size of approximately 80 nm and a lightfastness value ranging from 6 to 7 on the blue wool scale and the at least one light inkjet ink comprises Pigment Yellow 213 having a particle size of approximately 80 nm and a lightfastness value of 8 on the blue wool scale.

48. The method of claim 34, wherein the at least one dark inkjet ink comprises Pigment Yellow 93 having a particle size of approximately 100 nm and a lightfastness value of 7 on the blue wool scale and the at least one light inkjet ink comprises Pigment Yellow 128 having a particle size of approximately 80 nm and a lightfastness value of 8 on the blue wool scale.

49. The method of claim 34, wherein the at least one dark inkjet ink comprises a phthalocyanine chromophore or an indanthrone chromophore having a particle size of greater than or equal to approximately 20 nm and the at least one light inkjet ink comprises a phthalocyanine chromophore or an indanthrone chromophore having a particle size of greater than or equal to approximately 40 nm.

50. The method of claim 34, wherein the at least one dark inkjet ink comprises a copper phthalocyanine pigment having a particle size of less than approximately 50 nm and the at least one light inkjet ink comprises a copper phthalocyanine pigment having a particle size of greater than or equal to approximately 60 nm.

51. The method of claim 34, wherein the at least one dark inkjet ink comprises a copper phthalocyanine pigment having a particle size of less than approximately 50 nm and the at least one light inkjet ink comprises an aluminum phthalocyanine pigment having a particle size of greater than or equal to approximately 60 nm.

52. The method of claim 34, wherein the at least one dark inkjet ink comprises an aluminum phthalocyanine pigment having a particle size of approximately 60 nm and the at least one light inkjet ink comprises a copper phthalocyanine pigment having a particle size of greater than or equal to approximately 80 nm.

53. The method of claim 34, wherein the at least one dark inkjet ink comprises Pigment Blue 15:3 having a particle size of approximately 40 nm and the at least one light inkjet ink comprises Pigment Blue 15:3 having a particle size of approximately 60 nm.

54. The method of claim 34, wherein the at least one dark inkjet ink comprises Pigment Blue 15:3 having a particle size of approximately 30 nm and the at least one light inkjet ink comprises Pigment Blue 60 having a particle size of approximately 50 nm.

55. The method of claim 34, wherein the at least one dark inkjet ink comprises a quinacridone pigment having a particle size of greater than or equal to approximately 15 nm and the at least one light inkjet ink comprises a quinacridone pigment having a particle size of greater than or equal to approximately 35 nm.

56. The method of claim 34, wherein the at least one dark inkjet ink comprises a diketopyrrolopyrrole pigment having a particle size of greater than or equal to approximately 50 nm and the at least one light inkjet ink comprises a diketopyrrolopyrrole pigment having a particle size of greater than or equal to approximately 80 nm.

57. The method of claim 34, wherein the at least one dark inkjet ink comprises a diketopyrrolopyrrole pigment having a particle size of approximately 50 nm and the at least one light inkjet ink comprises a diketopyrrolopyrrole pigment having a particle size of approximately 100 nm.

58. The method of claim 34, wherein the at least one dark inkjet ink comprises a quinacridone pigment having a particle size of less than approximately 50 nm and the at least one light inkjet ink comprises a quinacridone pigment having a particle size of greater than approximately 70 nm.

59. The method of claim 34, wherein the at least one dark inkjet ink comprises Pigment Red 122 having a particle size of approximately 25 nm and the at least one light inkjet ink comprises Pigment Red 122 having a particle size of approximately 60 nm.

60. The method of claim 34, wherein the at least one dark inkjet ink comprises Pigment Red 254 having a particle size of approximately 50 nm and the at least one light inkjet ink comprises Pigment Red 254 having a particle size of approximately 100 nm.

61. The method of claim 34, wherein the at least one dark inkjet ink comprises Pigment Red 122 having a particle size of less than approximately 50 nm and the at least one light inkjet ink comprises Pigment Red 122 having a particle size of greater than approximately 50 nm.

62. The method of claim 34, wherein the at least one light inkjet ink comprises Pigment Red 202 having a particle size of approximately 100 nm and a lightfastness value of 8 on the blue wool scale and the at least one dark inkjet ink comprises Pigment Red 209 having a particle size of approximately 60 nm and a lightfastness value of 7 on the blue wool scale.

63. The method of claim 34, wherein the at least one dark inkjet ink comprises a γ form of Pigment Violet 19 and the at least one light inkjet ink comprises a β form of Pigment Violet 19.

64. The method of claim 34, wherein the at least one dark inkjet ink comprises a β form of Pigment Violet 19 and the at least one light inkjet ink comprises Pigment Red 122.

65. The method of claim 34,wherein applying said at least one dark inkjet ink comprises applying at least a dark black inkjet ink to the print medium, and wherein applying said at least one light inkjet ink comprises applying at least a light black inkjet ink to the print medium.

* * * * *

UNITED STATES PATENT AND TRADEMARK OFFICE
CERTIFICATE OF CORRECTION

| | | |
|---|---|---|
| PATENT NO. | : 7,591,889 B2 | Page 1 of 1 |
| APPLICATION NO. | : 11/071354 | |
| DATED | : September 22, 2009 | |
| INVENTOR(S) | : John L. Stoffel et al. | |

It is certified that error appears in the above-identified patent and that said Letters Patent is hereby corrected as shown below:

In column 14, line 60, in Claim 4, delete "napthols," and insert -- naphthols, --, therefor.

In column 17, line 34, in Claim 33, delete "ink," and insert -- ink --, therefor.

In column 18, line 21, in Claim 39, delete "napthols," and insert -- naphthols, --, therefor.

In column 20, line 54, in Claim 65, delete "claim 34,wherein" and insert -- claim 34, wherein --, therefor.

Signed and Sealed this
Eighth Day of March, 2011

David J. Kappos
*Director of the United States Patent and Trademark Office*